Sept. 23, 1958          A. BOSCHI          2,853,337

RESILIENT WHEEL, MORE PARTICULARLY FOR RAIL VEHICLES

Filed Nov. 12, 1957          2 Sheets–Sheet 2

United States Patent Office 2,853,337
Patented Sept. 23, 1958

2,853,337

RESILIENT WHEEL, MORE PARTICULARLY FOR RAIL VEHICLES

Antonio Boschi, Milan, Italy

Application November 12, 1957, Serial No. 695,867

Claims priority, application Italy December 22, 1956

2 Claims. (Cl. 295—11)

This invention relates to resilient wheels, more particularly for rail vehicles, of the type comprising a hub, a rim coaxial with the hub, a radial flange extending from the hub towards the rim, two lateral flanges fast with the rim and extending towards the hub on each side of the hub flange and pre-compressed rubber elements (rings or ring segments) between each of the lateral flanges fast with the rim and the central flange fast with the hub.

In order to cause the flanges to maintain the rubber elements in their pre-compressed condition, the wheels of the above described type generally employ clamping bolts or screws, which are sensitive and unreliable parts, inasmuch as they are liable to become loosened break or undergo alterations on assembly, etc. It has been ascertained that wheel shocks, for instance on rail joints mostly result in loosening of the bolts and breakage thereof.

The main object of this invention is to provide in a resilient wheel of the above mentioned type means adapted to cause the lateral flanges to hold the rubber elements in their compressed condition without employing bolts or similar connecting members.

A further object of this invention is to provide the above means of a type such as to be easily accommodated in the wheel, easy to assemble and of indefinite or in any case longer life than the rubber elements employed.

According to this invention, in a resilient wheel structure comprising a hub, a radial disc-shaped flange extending from the hub, a rigid metallic rim coaxial with the hub having a substantially cylindrical inner surface facing the hub, a pair of annular rigid flanges extending from the said inner surface on the rim on opposite sides of the disc-shaped flange, and ring-like rubber elements attached to opposite faces of the disc-shaped flange in axially pre-compressed relationship between the disc-shaped flange and the respective annular flange, there is provided a radially inwardly directed annular abutment extending from the said surface at one axial end of the latter, one of the said annular flanges having a circumfrerential portion thereof axially abutting against the said abutment, and the other of the said annular flanges having a circumferential portion thereof in a shrink fit engagement with the said surface.

Figure 1:
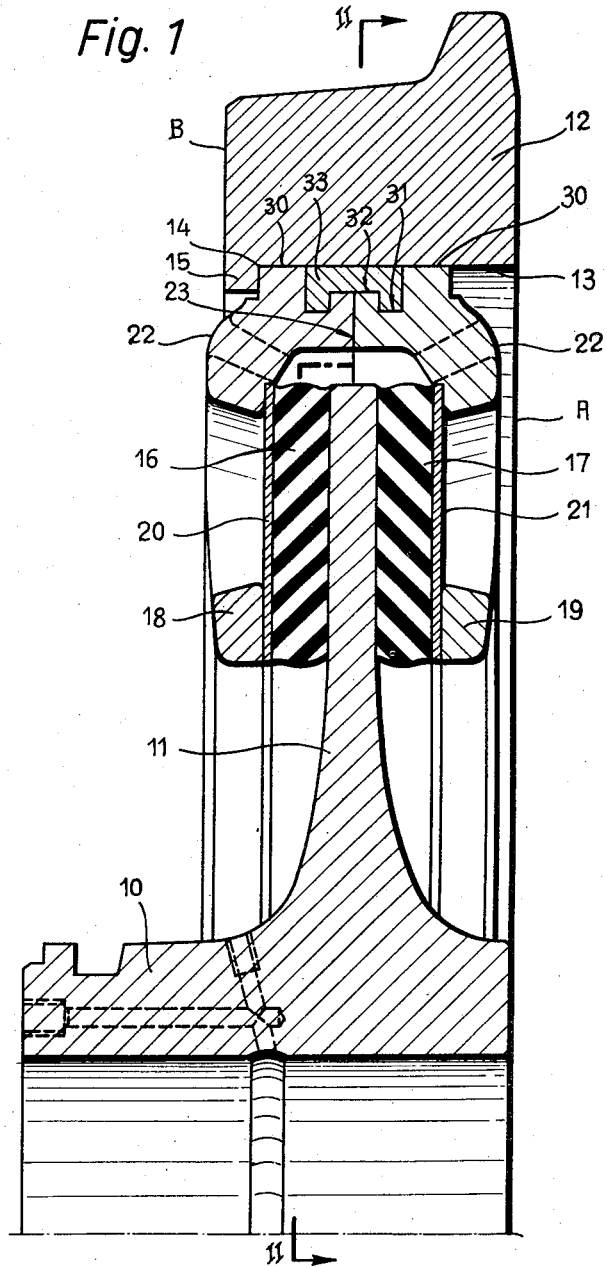
Figure 2:
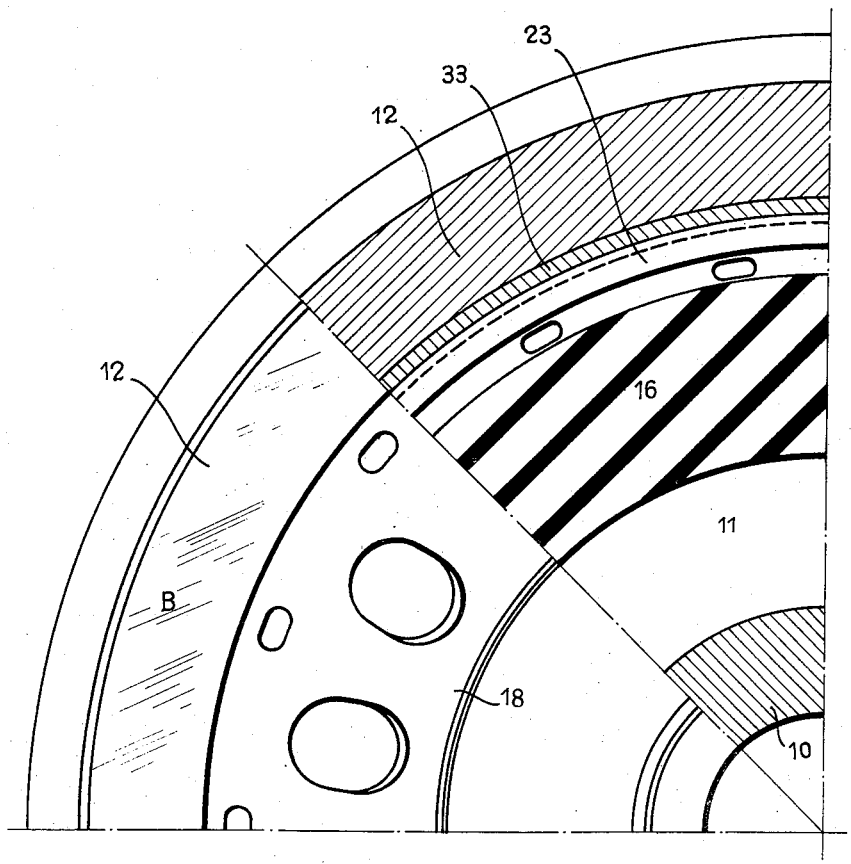

Further characteristic features and advantages of this invention will be understood from the appended description referring to the accompanying drawings given by way of example only, wherein:

Figure 1 is a radial sectional view of one half of the improved resilient wheel, the other half of which is identical with the representation, and Figure 2 shows a quadrant of the wheel shown in Figure 1 part of which is sectioned on line II—II of Figure 1.

In the drawing, a hub 10, such as a steel hub, has rigid therewith a circular radial flange 11 extending from the hub towards the rim 12. The rim 12 is coaxial with the hub 10 and has a cylindrical inner surface 13 extending from the flat face A of the rim towards a radial annular stop surface 14 created by a bead 15 adjacent the opposite flat face B of the rim.

Two rubber rings 16, 17 are vulcanized to opposite faces on the flange 11 coaxially with the hub and maintained in an axially compressed condition by radial annular flanges 18, 19, respectively, through the interposition of annular plates 20, 21 respectively, each vulcanized to its associated rubber ring. The two flanges 18, 19, encircling on both sides an annular peripheral region on the central flange 11, are bent at their outer periphery towards each other, as indicated at 22, and abut against each other over a radial annular region 23 situated substantially in the plane of the central flange 11. The outer peripheral surface of each of the two lateral flanges 18, 19 comprises a cylindrical surface 30, a second cylindrical surface 31 of smaller diameter and a third cylindrical surface 32 intermediate in diameter between the surfaces 30 and 31. The surfaces 32 on both flanges are adjacent the annular contact region 23 between the flanges, while the surface 31 of each flange separates the surfaces 30 and 32 and connects with the latter over radial annular faces visible in Figure 1. These radial annular faces confine together with the cylindrical surfaces 31 and 32 on both flanges 18, 19 between the flanges and rim an annular clearance or chamber of U-shaped cross section receiving an annular member or ring 33 of complementary cross-section. The member 33 preferably consists of two semi-annular segments separated by a diametral plane so that, in the absence of the rim 12, the two constituent segments of the member 33 can be fitted to the flanges holding the latter in the position shown in Figure 1.

The lateral flange 19 at least is in a shrink fit engagement with the rim 12, though in the construction shown such fit has been employed in connection with the flange 18 also, this arrangement being held to be preferable in most cases.

For this purpose the diameter of the peripheral surfaces 30 of the flanges 18, 19 is originally, that is before assembly of the wheel, somewhat larger than the diameter of the cylindrical surface 13 of the rim. For assembly the two flanges 18, 19 are placed between the platens of a suitable press with the flange 11 and rubber elements 16, 17 positioned between the flanges 18, 19. The press is then operated thereby drawing together the flanges 18, 19 till they contact at the annular contact region 23, whereby the rubber elements 16, 17 are pre-compressed to the desired extent. With the flanges 18, 19 drawn together the two semi-annular segments of the U-shaped retaining member 23 are then fitted to the periphery of the flanges. Subsequently, the rim 12 is heated to a sufficient temperature for the rim upon its heat expansion to be engaged in a tight fit by its cylindrical surface 13 on the cylindrical surfaces 30 on the flanges 18, 19 till the flange 18 is stopped against the annular abutment surface 14. During this fitting operation the flanges 18, 19 are preferably overflown with water to prevent heat from the rim 12 to propagate through the flanges to the rubber elements 16, 17. The rim 12 is finally cooled, so that the rim contracts and grips by its surface 13 the surfaces 30 of the flanges 18, 19.

As is well known in shrink fit technique the above fit results in a mutual intercrystalline penetration of the metal of the flanges 18, 19 and rim 12, respectively. By suitably proportioning the initial diameters of the surfaces 13, 30, areas of the surfaces 30 and thickness of the flanges 18, 19 it is possible to effect a radial grip such that the resulting mutual penetration of the metals is sufficient to cause the flanges 18, 19 to maintain the rubber elements 16, 17 in a compression condition, as shown in Figure 1. By cutting a wheel according to this invention on a radial plane and employing the well known technique for micrographic investigation of the grip zones between the surfaces 30 and surface 13 it can be ascertained that an intricate configuration inherent to shrink-fit results at these zones instead of a mere sharp contact surface.

It should be noted that according to a preferred embodiment the retaining member 33 is not involved in the shrinkage-fit, its outer peripheral surface at the utmost slightly contacting the adjacent annular region on the surface 13 of the rim 12. Consequently, the retaining member 33 should be considered in the specific case as a safety member adapted to exert on the flanges 18, 19 its retaining action only when the clamping action by the rim 12 should decrease during use of the wheel, even though the latter event has been found in practice to be merely hypothetical.

Finally, it should be noted that in the construction shown the flanges 18, 19 fixedly secured to the rim 12 are of a general cup-shaped configuration including curved regions 22. It has been ascertained that such configuration considerably improves strength of the flanges against axial loads, without in the least adversely affecting the gripping engagement between the surfaces 30 and surface 13.

It is further noteworthy that the engagement region between the surface 30 on the flange 19 and surface 13 on the rim 12 is spaced from the rim face A. This arrangement has been found to be exceptionally advantageous respect of strength of the gripping regions against axial load, that is, load directed along the generatrices of the cylindrical surface 13. In fact, it has been ascertained that the diameter of the free portion of the surface 13, that is, of the portion confined between the engagement region with flange 19 and rim face A is in the assembled wheel somewhat smaller than the diameter of the engagement region, thereby forming an abutment step resulting from wedging of the surface 30 on the flange 19 into the rim surface 13. Therefore, it is clear that under these conditions the engagement region is capable of withstanding appreciably higher axial loads than if the engagement region were directly adjacent the rim face A.

It is understood that this invention is not limited to the embodiment shown on the drawing and various modifications can be made thereto without departing from the scope of the appended claims.

What I claim is:

1. In a resilient wheel structure comprising a hub, a radial disc-shaped flange extending from the hub, a rigid metallic rim coaxial with the hub having a substantially cylindrical inner surface facing the hub, a pair of annular rigid flanges extending from the said inner surface on the rim on opposite sides of the disc-shaped flange, and ring-like rubber elements attached to opposite faces of the disc-shaped flange in axially pre-compressed relationship between the disc-shaped flange and the respective annular flanges, a radially inwardly directed annular abutment extending from the said surface at one axial end of the latter, one of said annular flanges having a circumferential portion thereof axially abutting against the said abutment, the other of the said annular flanges having a circumferential portion thereof in a shrink-fit engagement with the said surface, a stepped circumferential groove in each flange adjacent the said surface of the rim thereby to define an annular chamber between the flanges and rim of a U-shaped cross-section, and a retaining member of correspondingly U-shaped cross-section in the said chamber capable of axially securing the annular flanges against disassembly.

2. In a resilient wheel as claimed in claim 1, the two annular flanges of a cup-shaped profile axially contacting each other along an annular zone inwardly adjacent the said chamber between the flanges, and the circumferential portion on the said other of the said annular flanges being axially spaced from the other axial end of the said surface of the rim.

References Cited in the file of this patent

UNITED STATES PATENTS

| | | |
|---|---|---|
| 1,714,290 | Alden | May 21, 1929 |
| 2,800,357 | Boschi | July 23, 1957 |

FOREIGN PATENTS

| | | |
|---|---|---|
| 979,174 | France | Dec. 6, 1950 |